United States Patent
Hosey et al.

(10) Patent No.: US 10,178,709 B2
(45) Date of Patent: Jan. 8, 2019

(54) REMOTELY TRIGGERING CALLS TO A PSAP

(71) Applicant: General Motors LLC, Detroit, MI (US)

(72) Inventors: Eric T. Hosey, Rochester, MI (US); Russell A. Patenaude, Macomb Township, MI (US); David A. Holt, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 358 days.

(21) Appl. No.: 14/100,363

(22) Filed: Dec. 9, 2013

(65) Prior Publication Data
US 2015/0163832 A1 Jun. 11, 2015

(51) Int. Cl.
*H04W 76/50* (2018.01)
*H04W 4/04* (2009.01)

(52) U.S. Cl.
CPC .......... *H04W 76/50* (2018.02); *H04W 4/04* (2013.01)

(58) Field of Classification Search
CPC ...... H04W 76/007; H04W 76/50; H04W 4/04
See application file for complete search history.

(56) References Cited

U.S. PATENT DOCUMENTS

| | | |
|---|---|---|
| 5,815,550 A | 9/1998 | Miller |
| 5,896,565 A | 4/1999 | Miller |
| 6,366,646 B1 | 4/2002 | Miller |
| 7,532,708 B2 | 5/2009 | Gault et al. |
| 8,180,316 B2 | 5/2012 | Hwang |
| 2004/0203569 A1 | 10/2004 | Jijina et al. |
| 2007/0191027 A1 | 8/2007 | McCormick et al. |
| 2011/0287733 A1* | 11/2011 | Cepuran et al. ......... 455/404.1 |

FOREIGN PATENT DOCUMENTS

CN 1187080 A1 7/1998

OTHER PUBLICATIONS www.onstar.com accessed Apr. 22, 2015 (text).*
www.onstar.com accessed Apr. 22, 2015 (image with jumbled text).*
Onstar Public Safety Training Facilitator Guide, Jul. 31, 2012, accessed from https://www2.onstar.com/tunnel-web/webdav/portal/document_library/us_english/flash/publicsafety/pdf/OnStar_Public_Safety_Training_Facilitator_Guide.pdf.*
http://www.911dispatch.com/2013/10/01/new-telematics-system-directly-dials-9-1-1/ accessed Apr. 27, 2015.*

* cited by examiner

*Primary Examiner* — David Orange
(74) *Attorney, Agent, or Firm* — David Willoughby; Reising Ethington P.C.

(57) ABSTRACT

A method of connecting a vehicle telematics unit with a public safety access point (PSAP) includes wirelessly calling a central facility using the vehicle telematics unit that generates a reason to contact the PSAP; determining a reason to contact the PSAP during the wireless call; and receiving a computer-readable command at the vehicle telematics unit from the central facility that directs the vehicle telematics unit to end the wireless call and locally place an emergency call.

14 Claims, 2 Drawing Sheets

_US 10,178,709 B2_

REMOTELY TRIGGERING CALLS TO A PSAP

TECHNICAL FIELD

The present invention relates to wireless communications and more particularly to directing wireless cellular devices to call a public safety access point (PSAP).

BACKGROUND

Vehicles have the ability to wirelessly communicate with a call center as well as other entities via a vehicle telematics unit. As part of these communications capabilities, vehicle telematics units can enable a telematics subscription service to receive calls from the vehicle. In this arrangement, a vehicle occupant can place requests to the telematics subscription service that include asking for turn-by-turn directions or seeking vehicle diagnostic services. Requests to the telematics subscription service can also be made when emergency assistance is needed. The telematics subscription service can offer a wide range of emergency assistance, which includes connecting or transferring the caller or vehicle occupant with a public safety access point (PSAP) that provides emergency services the area in which the vehicle is located. However, vehicles that place the requests for emergency assistance can be found just about anywhere in the world. Sometimes, the vehicle may be located in an area where the telematics subscription service does not have contact information for a local PSAP. Or certain areas of the world may not permit the telematics subscription service to contact the PSAP on behalf of the vehicle occupant due to local laws and ordinances. It can be helpful for the telematics subscription service to be able to connect the vehicle occupant with a PSAP that is local to the vehicle despite these situations.

SUMMARY

According to an embodiment, there is provided a method of connecting a vehicle telematics unit with a public safety access point (PSAP). The method includes wirelessly calling a central facility using the vehicle telematics unit; determining a reason to contact the PSAP during the wireless call; and receiving a computer-readable command at the vehicle telematics unit from the central facility that directs the vehicle telematics unit to end the wireless call and locally place an emergency call.

According to another embodiment, there is provided a method of connecting a vehicle telematics unit with a public safety access point (PSAP). The method includes receiving a wireless call for a telematics service request at a central facility from the vehicle telematics unit; determining a location of the vehicle telematics unit; deciding at the central facility to transfer the wireless call to a PSAP within a serviceable distance of the location of the vehicle telematics unit; determining at the central facility that contact information for the PSAP within the serviceable distance is not available; and transmitting a computer-readable command from the central facility instructing the vehicle telematics unit to end the wireless call and place an emergency call through a cell tower.

According to yet another embodiment, there is provided a method of connecting a vehicle telematics unit with a public safety access point (PSAP). The method includes receiving a wireless call for a telematics service request at a central facility from the vehicle telematics unit; determining a location of the vehicle telematics unit; deciding at the central facility to transfer the wireless call to a PSAP within a serviceable distance of the location of the vehicle telematics unit; determining at the central facility that transferring the wireless call to the PSAP within the serviceable distance of the location of the vehicle is not legally-permissible; and transmitting a computer-readable command from the central facility instructing the vehicle telematics unit to end the wireless call and place an emergency call through a cell tower.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below determines when a central facility is unable to transfer or connect a wireless call from a vehicle telematics unit to a nearby PSAP and then transmits a command to the vehicle telematics unit instructing it to end the call and place an emergency call to the nearby PSAP. Central facilities, such as wireless call centers or other back office facilities, can field and respond to telematics service requests. In one example, a vehicle occupant can call the central facility using the vehicle telematics unit to request emergency assistance, which in some instances involves contacting a PSAP nearby or local to the vehicle. The central facility can determine the location of the vehicle, access a database that includes the identity, location, and contact information for a large number of available PSAPs, identify a PSAP in the database that is nearby or local to the vehicle, and then use the contact information associated with identified PSAP to forward or transfer the existing call used to make the telematics service request to that PSAP. But for a number of reasons, this is sometimes not possible.

In one example, the central facility may not be able to locate the contact information for a PSAP nearby the vehicle telematics unit. Vehicles can be found nearly anywhere in the world. Vehicles having vehicle telematics units are manufactured and shipped globally. By nature vehicles are mobile and travel to a wide variety of places. Coupled with these facts, worldwide communications are increasingly common through digital techniques, such as packet data communications and voice over Internet protocol (VoIP). The central facilities may receive communications from vehicles in unfamiliar areas. To ensure that the vehicle occupant is placed in contact with an appropriate PSAP, the central facility can generate a computer-readable command that, when received by the vehicle telematics unit, causes it to end any current call and place an emergency call using a local cell tower. In some implementations, the emergency call can be equivalent to dialing "911" in the United States or "112" in Europe. When such an emergency call is placed (e.g., dialing "911") the cell tower used by the vehicle telematics unit recognizes the emergency nature of the call and automatically routes it to the nearby or local PSAP that services the area in which the cell tower is located. As a result, the vehicle telematics unit can be connected to the appropriate PSAP.

Figure 1:
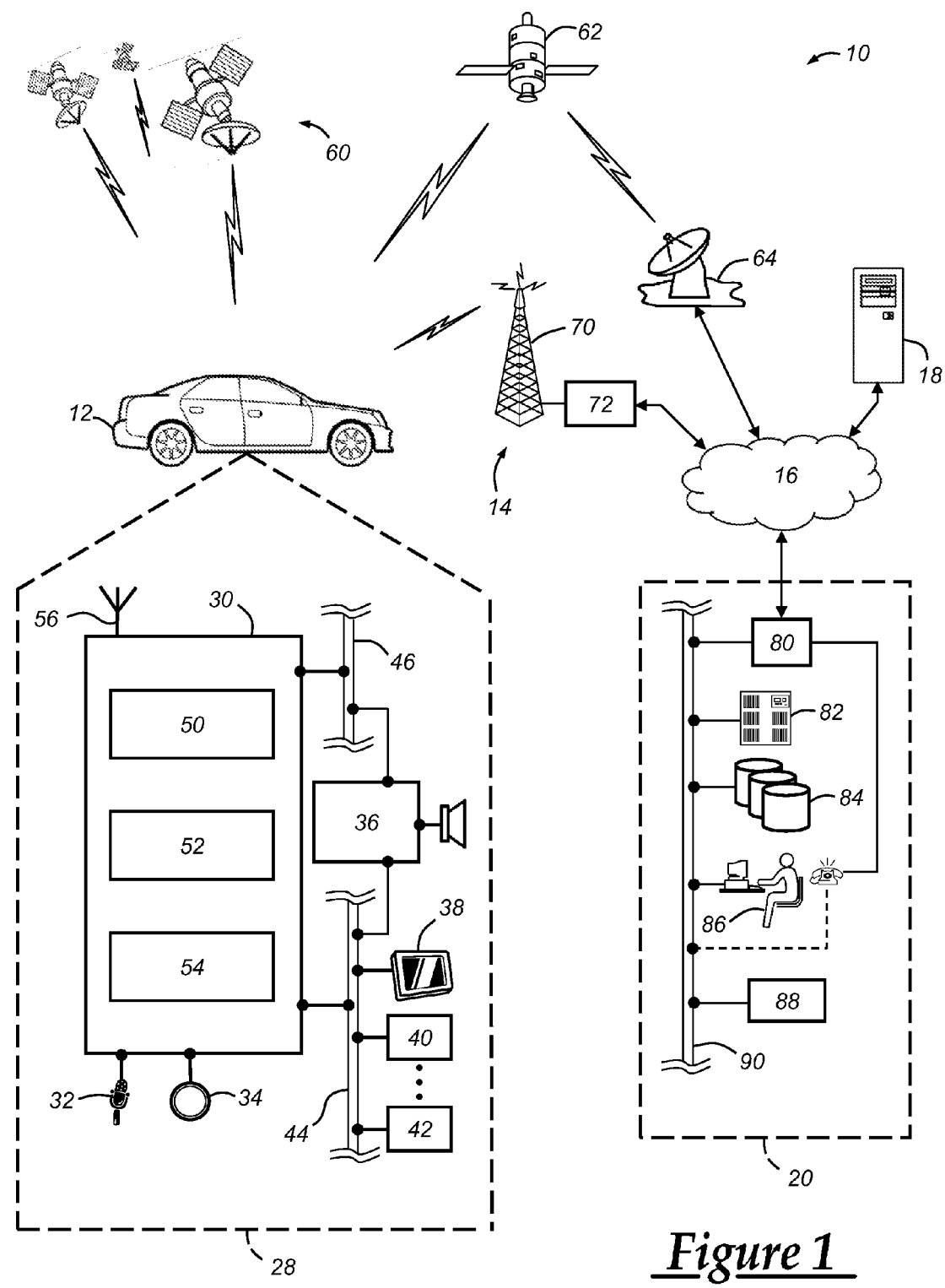
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
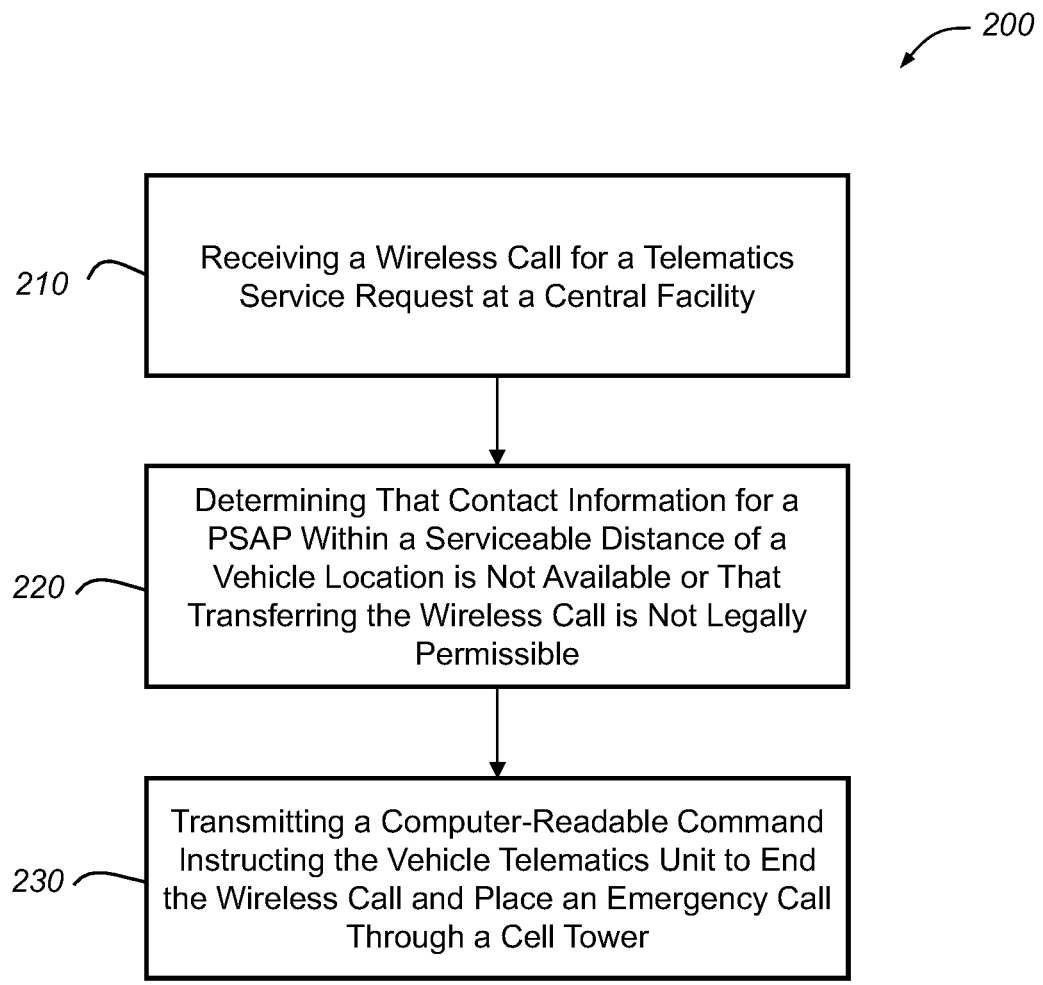
FIG. 2 is a flow chart depicting an embodiment of a method of connecting a vehicle telematics unit with a public safety access point (PSAP).

Turning now to FIG. 2, there is shown an implementation of a method (200) of connecting the vehicle telematics unit 30 with a public safety access point (PSAP). The method 200 begins at step 210 by receiving a wireless call for a telematics service request at a central facility from the vehicle telematics unit 30. With respect to this embodiment, the central facility will be described as the call center 20. But it should be appreciated that other central facilities are possible, such as computer 18. The wireless call can be initiated solely as an emergency request for emergency services thereby providing a reason for the call center 20 to transfer or forward the call to the PSAP nearby or local to the vehicle 12. Or in another example, the wireless call can be a request for navigational directions, but during the call the vehicle occupant or caller may witness an accident that requires emergency assistance such that it generates a reason to contact the PSAP near the vehicle 12. As part of handling the telematics service request, a location of the vehicle telematics unit 30 can be determined. In one example, the vehicle telematics unit 30 can receive the location of the vehicle 12 from the GPS module 40 and transmit the location as data to the call center 20. The location, in the form of latitude and longitude coordinates, can be transmitted along with the call placed for the telematics service request (e.g., simultaneous voice and data) or can be transmitted to the call center 20 using a separate call. The method 200 proceeds to step 220.

At step 220, it can be determined at the call center 20 that contact information for a PSAP within a serviceable distance of the location of the vehicle is not available or that transferring the wireless call to the PSAP within the serviceable distance of the location of the vehicle is not legally-permissible. After receiving the wireless call for a telematics service request, the call center 20 can decide to transfer the wireless call to a PSAP within a serviceable distance of the location of the vehicle telematics unit 30. The serviceable distance of the PSAP can be the geographic area over which a particular PSAP provides emergency services. For instance, Detroit, Mich. may use one PSAP to coordinate emergency services within the city limits of Detroit. If the vehicle 12 is located within the city limits of Detroit, the vehicle 12 can be determined to be within a serviceable distance of the Detroit PSAP. However, if the vehicle 12 is located in Cleveland, Ohio, the vehicle 12 would not be within a serviceable distance of the Detroit PSAP. In that case, when the vehicle 12 is in Cleveland, it can be helpful to identify PSAPs that service the area of Cleveland.

Knowing the location of the vehicle 12 or vehicle telematics unit 30, the call center 20 can then compare the location with entries in a PSAP database. The PSAP database can include the identities of a large number of PSAPs along with the locations of those PSAPs and contact information. For instance, each PSAP in the PSAP database can be associated with a range of latitude and longitude values and as part of searching for a PSAP local or nearby the vehicle 12, the call center 20 can identify PSAPs having a range of latitude and longitude coordinates that the location of the vehicle 12 falls within. However, sometimes a search of the PSAP database may not generate any matches between the location of the vehicle 12 and PSAP locations.

In another implementation, the call center 20 can use the location of the vehicle 12 to determine whether or not it is legally-permissible to transfer the wireless call to a PSAP. For instance, the call center 20 can maintain a legally-permissible database that can define one or more geographical areas within which forwarding emergency calls from the call center 20 is not permitted. The call center 20 can compare the location of the vehicle 12 with geo-fenced regions represented by a plurality of latitude and longitude coordinates or coordinate pairs. If the location of the vehicle 12 is determined to be located within a geo-fence or latitude/longitude coordinate range that forbids forwarding calls to PSAPs, the call center 20 could decide not to attempt to forward the wireless call to a PSAP. By "legally-permissible," it should be understood that this refers not only to rules enacted by governmental authorities for a particular region but also to rules implemented by a wireless carrier system 14 that may not permit third parties to forward emergency calls to PSAPs. In that case, the vehicle telematics unit 30 can receive a network identifier from the cell tower 70 and transmit the network identifier to the call center 20. The call center 20 can then compare the network identifier received from the vehicle telematics unit 30 to entries in the legally-permissible database, which can contain identities of wireless carrier systems 14 (e.g., network identifiers) that forbid forwarding calls to PSAPs. When the network identifier received from the vehicle telematics unit 30 matches an entry in the legally-permissible database, the call center 20 can decide not to forward the wireless call to the PSAP. The method 200 proceeds to step 230.

At step 230, a computer-readable command is transmitted from the call center 20 instructing the vehicle telematics unit 30 to end the wireless call and place an emergency call through the cell tower 70. Once it is determined that the call center 20 is not able forward of transfer the wireless call to a PSAP, the call center 20 can then generate the computer-readable command that can be read and executed by the processor 52 of the vehicle telematics unit 30. The vehicle telematics unit 30 can receive the computer-readable command and once executed can then end the wireless call with the call center 20 and place the emergency call through the cell tower 70. That is, the computer-readable command can override other functions that are being carried out by the vehicle telematics unit 30, such as the wireless call, and force the unit 30 to place the emergency call without input from the vehicle occupant. As discussed above, the emergency call can be similar to or the same as dialing "911" at the vehicle telematics unit 30 such that the cell tower 70 can recognize the emergency nature of the call and automatically route the emergency call to the PSAP local or nearby the vehicle 12 such that the PSAP is within a serviceable distance of the vehicle. The cell tower 70 location is fixed and known and, as a result, the cell tower 70 can be programmed to know the identity of the PSAP within a serviceable distance of vehicle telematics units 30 that are "camped on" the cell tower 70 or able to place successful cellular calls using the cell tower 70.

The computer-readable command can also instruct the vehicle telematics unit 30 to provide data from the vehicle 12 to the call center 20 while the emergency call is placed and/or while the vehicle telematics unit 30 is connected with the PSAP. This data can relate to vehicle functions, such as location, airbag status, or monitoring movement within the vehicle 12. In one implementation, the vehicle telematics unit 30 can be capable of communicating using simultaneous voice and data cellular protocols. The vehicle telematics unit 30 can then provide voice communications between the vehicle occupant and the PSAP while at the same time communicating data between the vehicle 12 and the call center 20. However, in another implementation, the computer-readable command can instruct the vehicle telematics unit 30 to send data from the vehicle 12 during the emergency call in the form of data packets via short message service (SMS) messages. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of connecting a vehicle telematics unit with a public safety access point (PSAP), comprising the steps of:
   (a) wirelessly calling a central facility using the vehicle telematics unit;
   (b) determining a reason to contact the PSAP during the wireless call; and
   (c) receiving a computer-readable command at the vehicle telematics unit from the central facility that directs the vehicle telematics unit to end the wireless call and locally place an emergency call in response to step (b) and based on a determination that it is not legally-permissible for the central facility to connect the vehicle telematics unit to the PSAP.

2. The method of claim 1, further comprising the step of determining a location of the vehicle telematics unit.

3. The method of claim 1, further comprising the step of placing the emergency call through a cell tower, which automatically routes the emergency call to a PSAP within a serviceable area of the vehicle telematics unit.

4. The method of claim 1, further comprising the steps of:
   receiving at the vehicle telematics unit a network identifier from a cell tower; and
   comparing the network identifier with identifiers of wireless carrier systems included in a database.

5. The method of claim 1, wherein step (c) is carried out in response to determining that a PSAP database does not include a listing for a PSAP within a serviceable distance from the vehicle telematics unit.

6. The method of claim 1, further comprising the step of communicating data from the vehicle telematics unit to the central facility after the emergency call has been established with the PSAP.

7. A method of connecting a vehicle telematics unit with a public safety access point (PSAP), comprising the steps of:
   (a) receiving a wireless call for a telematics service request at a central facility from the vehicle telematics unit;
   (b) determining a location of the vehicle telematics unit;
   (c) deciding at the central facility to transfer the wireless call to a PSAP within a serviceable distance of the location of the vehicle telematics unit;
   (d) determining at the central facility that contact information for the P SAP within the serviceable distance is not available in a database, accessible by the central facility, that includes the identity information for a plurality of PSAPs; and
   (e) transmitting a computer-readable command from the central facility instructing the vehicle telematics unit to end the wireless call and place an emergency call through a cell tower.

8. The method of claim 7, wherein the wireless call is received at a call center.

9. The method of claim 7, further comprising the steps of comparing the location of the vehicle telematics unit with entries in a PSAP database; and
   determining that the location of the vehicle telematics unit fails to match location information associated with the entries in the PSAP database.

10. The method of claim 7, further comprising the step of communicating data from the vehicle telematics unit to the central facility after the emergency call has been established with the PSAP.

11. A method of connecting a vehicle telematics unit with a public safety access point (PSAP), comprising the steps of:
   (a) receiving a wireless call for a telematics service request at a central facility from the vehicle telematics unit;
   (b) determining a location of the vehicle telematics unit;
   (c) deciding at the central facility to transfer the wireless call to a PSAP within a serviceable distance of the location of the vehicle telematics unit;
   (d) determining at the central facility that transferring the wireless call to the PSAP within the serviceable distance of the location of the vehicle is not legally-permissible; and
   (e) transmitting a computer-readable command from the central facility instructing the vehicle telematics unit to end the wireless call and place an emergency call through a cell tower in response to step (d).

12. The method of claim 11, further comprising the steps of:
   receiving a network identifier from the cell tower; and
   comparing the network identifier with identifiers of wireless carrier systems included in a database.

13. The method of claim 11, wherein the wireless call is received at a call center.

14. The method of claim 11, further comprising the step of communicating data from the vehicle telematics unit to the central facility after the emergency call has been established with the PSAP.

* * * * *